US005817354A

United States Patent [19]
Mozaffar et al.

[11] Patent Number: 5,817,354
[45] Date of Patent: Oct. 6, 1998

[54] HIGH THROUGHPUT DEBITTERING

[75] Inventors: Zahid Mozaffar, Union City; Quirinus Ronnie Miranda, San Jose; Vinit Saxena, Pleasanton, all of Calif.

[73] Assignee: Sepragen Corporation, Hayward, Calif.

[21] Appl. No.: 702,760

[22] Filed: Aug. 22, 1996

[51] Int. Cl.$^6$ .................................. A23L 2/80; C02F 1/42
[52] U.S. Cl. .......................... 426/271; 426/422; 426/424; 426/490; 426/599; 426/616; 210/198.2; 210/502.1; 210/656
[58] Field of Search .................................... 426/271, 490, 426/422, 424, 599, 616; 210/198.2, 656, 502.1

[56] References Cited

U.S. PATENT DOCUMENTS

| | | | |
|---|---|---|---|
| 2,510,797 | 6/1950 | Burdick et al. | 99/105 |
| 2,681,907 | 6/1954 | Wender | 260/210 |
| 3,422,605 | 1/1969 | Crowley | 55/386 |
| 3,453,811 | 7/1969 | Crowley | 55/386 |
| 3,463,763 | 8/1969 | Griffiths | 260/78 |
| 3,780,866 | 12/1973 | Ek et al. | 210/198 |
| 3,989,854 | 11/1976 | Chandler et al. | 426/422 |
| 4,133,562 | 1/1979 | Andren | 285/187 |
| 4,154,862 | 5/1979 | Guadagni et al. | 426/536 |
| 4,297,220 | 10/1981 | Meitzner et al. | 210/690 |
| 4,354,932 | 10/1982 | McNeil | 210/198.2 |
| 4,439,458 | 3/1984 | Puri | 426/330 |
| 4,514,427 | 4/1985 | Mitchell et al. | 426/271 |
| 4,627,918 | 12/1986 | Saxena | 210/656 |
| 4,676,898 | 6/1987 | Saxena | 210/198.2 |
| 4,865,729 | 9/1989 | Saxena et al. | 210/658 |
| 5,452,659 | 9/1995 | Pupic | 101/415.1 |

FOREIGN PATENT DOCUMENTS 2125539  2/1972  France .............................. A23L 1/00

OTHER PUBLICATIONS

Norman and Kimball, "A Commercial Citrus Debittering System," *Trans. Citrus Engineer. Conf. ASME* 36:1–31 [1990].

Maier et al., "Limonin and Other Limonoids," in *Citrus Science and Technology*, S. Nagy et al. (eds.), AVI Publishing Co., Westport, CN, 1:355–396 [1977].

Maier et al., "Limonin and Limonoids," *Citrus Nutr. Qual.* 143:63–82 [1980].

Rouseff, "Nomilin, a New Bitter Component in Grapefruit Juice," *J. Agricult. Food Chem.* 30:504–507 [1982].

Rouseff, "Flavonoids and Citrus Quality," in *Citrus Nutrition and Quality* (S. Nagy and J.A. Attaway, eds.), ACS Symposium Series 143:63–65 [1980].

Albach et al., "Limonin Content of Juice from Marrs and Hamlin Oranges [*Citrus sinensis* (L.) Osbeck]," *J. Agric. Food Chem.* 29:313–315 [1981].

Maier et al., "Development of Methods For Producing Nonbitter Navel Orange Juice," *Citrograph* 56:373–375 [1971].

Tatum and Berry, "Method for Estimating Limonin Content of Citrus Juices," *J. Food Sci.* 38:1244–1246 [1973].

McColloch, "Preliminary Studies on Debittering Navel Orange Products," *Calif. Citrograph* 35:290–292 [1950].

Chandler et al., "Removal of Limonin From Bitter Orange Juice," *J. Food Agricult.* 19:83–86 [1968].

Nisperos and Robertson, "Removal of Naringin and Limonin from Grapefruit Juice using Polyvinylpyrrolidone," *Philip Agriculture* 65:275–282 [1982].

(List continued on next page.)

*Primary Examiner*—Helen Pratt
*Attorney, Agent, or Firm*—Medlen & Carroll, LLP

[57] ABSTRACT

The present invention relates to methods and materials for use in processing citrus products, and more particularly, the debittering of juices. In particular, the present invention is suited to the debittering of citrus juices. In one preferred embodiment, the citrus juice debittered by the present invention is grapefruit or orange juice. The methods allow for high flow rates which, in turn offer advantages associated with permitting high throughput of juice to be treated.

19 Claims, 7 Drawing Sheets

OTHER PUBLICATIONS

Chandler and Johnson, "Cellulose Acetate as a Selective Sorbent for Limonin in Orange Juice," *J. Sci. Food Agricult.* 28:875–884 [1977].

Barmore et al., "Reduction of Bitterness and Tartness in Grapefruit Juice with Florisil," *J. Food Sci.* 512:415–417 [1986].

Shaw and Buslig, "Selective Removal of Bitter Compounds from Grapefruit Juice and from Aqueous Solution with Cyclodextrin Polymers and with amberlite XAD–4," *J. Agricult. Food Chem.* 34:837–840 [1986].

Gage et al., "The Use of Ion Exchange Resins with Flavonoid Compounds," *Science* 113:522–523 [1951].

Couture and Rouseff, "Debittering and Deacidifying Sour Orange (*CItrus aurantium*) Juice Using Neutral and Anion Exchange Resins," *J.Food Sci.* 57:380–384 [1992].

Hernandez et al., "Evaluation of Ultrafiltration and Adsorption to Debitter Grapefruit and Grapefruit Pulp Wash," *J. Food Sci.* 57:664–670 [1992].

Wethern, "Citrus Debittering with Ultrafiltration/Adsorption Combined Technology," *Trans. Citrus Engineer. Conf. ASME* 37:48–66 [1991].

Kimball, "Debittering of Citrus Juices Using Supercritical Carbon Dioxide," *J. Food Sci.* 52:481–482 [1987].

Ono et al., "Preparation and Properties of Naringinase Immobilized by Ionic Binding to DEAE–Sephadex," *J. Ferment. Technol.* 55:493–500 [1977].

Olson et al., "Naringin Bitterness of Grapefruit Juice Debittered with Naringinase Immobilized in a Hollow Fiber," *J. Food Sci.* 44:1358–1361 [1979].

Gray and Olson, "Hydrolysis of High Levels of Naringin in Grapefruit Juice Using a Hollow Fiber Naringinase Reactor," *J. Agricult. Food Chem.* 29:1298–1301 [1981].

Hasegawa, "Limonoid Debittering of Citrus Juice Using Immobilized Bacterial Cell Systems," *Food Biotechnol.* 1:249–261 [1987].

Kealey and Kinsella, "Orange Juice Quality with an Emphasis on Flavor Components," in *Critical Reviews in Food Science & Nutrition,* 11:1–40 [1979].

Berry, "Recent Developments in Citrus Processing, Products and Specialty Products," *Proc. Intr. Soc. Citriculture* 2:896–899 [1981].

Johnson and Chandler, "Ion Exchange and Adsorbent Resins for Removal of Acids and Bitter Principles from Citrus Juices," *J. Sci. Food Agricult.,* 36:480–484 [1985].

Johnson and Chandler, "Adsorptive Removal of Bitter Principles and Titratable Acid from Citrus Juices," *Food Technol.* 42:130–137 [1988].

Matthews et al., "Removal of Limonin and Naringin from Citrus Juice by Styrene–Divinylbenzene Resins," *Food Technol.* 44:130–132 [1990].

Manlan et al., "Evaluation of the Properties of Polystyrene Divinylbenzene Adsorbents for Debittering Grapefruit Juice," *Journal of Food and Science* 55(2):440–445 [1990].

Hendrickson et al., "Ultraviolet Absorption Technique to Determine the Naringin Content of Grapefruit Juice," *Proc. Florida Hort. Soc.* 71:194–198 [1958].

Plummer, *An Introduction to Practical Biochemistry,* McGraw–Hill Book Co., UK, pp. 318–319 [1978].

Shaw and Wilson, "A Rapid Method for Determination of Limonin in Citrus Juices by High Performance Liquid Chromatography," *J. Food Sci.* 49:1216–1218 (1984).

Manthey and Grohmann, "Concentrations of Hesperidin and Other Orange Peel Flavonoids in Citrus Processing Byproducts," *J. Agric. Food Chem.* 44:811–814 (1996).

Widmer and Martin, "Analysis of Limonin in Citrus Juices by Direct Injection and On–Line Sample Clean–Up," *Forty–Fifth Annual Citrus Processors' Meeting, Oct. 12, 1994,* (State of Florida—Department of Citrus: Lakeland, Florida and Citrus Research and Education Center: Lake Alfred, Florida, pp. 21–24).

Rouseff et al., "New HPLC Determination of Citrus Carotenoids Employing a C–30 Reverse Phase Column and Photodiode Array Detection," *Forty–Fifth Annual Citrus Processors' Meeting, Oct. 12, 1994,* (State of Florida—Department of Citrus: Lakeland Florida, and Citrus Research and Education Center: Lake Alfred, Florida, pp. 15–19).

HIGH THROUGHPUT DEBITTERING

FIELD OF THE INVENTION

The present invention is related to the processing of citrus products, and more particularly, the removal of bitterness from juices and other fluids.

BACKGROUND OF THE INVENTION

Many factors influence the quality of citrus products, including juices. To consumers, taste, flavor, acidity, bitterness or tartness, color, and texture are important considerations for acceptance of these products. Indeed, consumer acceptance is a critical factor to the citrus industry. This is of particular importance in view of the world market for citrus products. For example, the world production of orange juice has reached an excess of 900 million single strength gallons (see, S. I. Norman and D. A. Kimball, Trans. Citrus Engineer. Conf., ASME 36:1–31 [1990]), and for grapefruit juice, the annual consumption is approximately 100 million single strength gallons (see, S. I. Norman and D. A. Kimball, Trans. Citrus Engineer. Conf., ASME 36:1–31 [1990]).

Bitterness in citrus juice products (e.g., orange and grapefruit juices) has been a long-standing consumer acceptance problem in the industry. The presence of bitterness in citrus fruit juices has resulted in attempts to limit or avoid the development of bitterness in the fruit used to produce juice. For example, because of the development of bitter taste that occurs in early to mid-season oranges and early season grapefruits, these fruits are rarely used in the production of juice. Thus, the presence of bitterness represents a significant loss in the amount of fruit available and suitable for use by the juice industry. In order to permit the use of early to mid-season fruits, as well as fruit varieties that naturally are more bitter than others, much research has been conducted to identify the chemical compounds responsible for the bitterness of citrus juices. This research has identified two major classes of compounds responsible for the bitterness of citrus juices, namely the limonoids and flavonoids.

Limonoids

The limonoids comprise a class of chemical compounds widely distributed in all citrus species (V. P. Maier et. al. in *Citrus Science and Technology*, S. Nagy et al. (eds.), AVI Publishing Co., Westport, Conn., 1:355–396 [1977]; and V.P. Maier et al., Citrus Nutr. Qual., 143:63–82 [1980]). The most important limonoid compound, limonin, is an intensely bitter compound that is of commercial significance in the citrus industry, as even low concentrations of this compound (e.g., 6 parts per million) may cause significant reductions in juice quality.

Limonin is a highly oxygenated triterpene dilactone, with the chemical formula $C_{26}H_{30}O_8$, and a molecular weight of approximately 470, and a volume of approximately 402 cubic angstroms. As shown in FIG. 1, limonin includes an epoxide, two lactone rings, a five-membered ether ring, and a furan ring. All other citrus limonoids have been reported to have the furan ring and at least one of the lactone rings (V. P. Maier et al., supra). Limonin is only slightly soluble in water and alcohol, although its water solubility is increased in the presence of sugar and pectin. It is soluble in glacial acetic acid, acetonitrile, and chloroform.

Limonin is produced as an esterification product of limonoic acid A-ring lactone. During extraction of citrus juice from fruit, this non-bitter lactone compound undergoes an enzyme-induced, acid-catalyzed, esterification to form the bitter compound known as limonin. During pasteurization and/or evaporation of the juice, heat catalyzes the esterification reaction. This production of limonin from limonoic acid A-ring lactone is often referred to as "delayed bitterness."

In addition to limonin, another limonoid known as "nomilin" has also been associated with delayed bitterness (see e.g., R. L. Rouseff, J. Agricult. Food Chem., 30:504–507 [1982]). However, it is usually present in much lower concentrations (e.g., <2 ppm) in citrus juice. Thus, it is of less commercial significance than limonin (S. I. Norman and D. A. Kimball, Trans. Citrus Engineer. Conf., ASME 36:1–31 [1990]).

Flavonoids

Flavonoids are chemicals that, like the limonoids, are widely distributed throughout the higher plant kingdom. There are two flavonoids (hesperidin and naringin) of particular importance as quality indicators for the citrus industry. For example, if it is present in citrus juice, hesperidin precipitate results in lower juice quality (see e.g., Norman and Kimball, supra). In addition, high concentrations of naringin also reduce juice quality (see e.g., Norman and Kimball, supra). The highest concentrations of naringin are found in the albedo portion of the citrus fruit, while the highest concentrations of limonin are found in the seeds and rag.

Naringin, with a molecular weight of approximately 580, an approximate volume of 465 cubic angstroms, and chemical formula $C_{27}H_{32}O_{14}$, is composed of one flavonoid group attached to a disaccharide (glucose-rhamnose). The structure of naringin is shown in FIG. 2. If the rhamnose is attached at the C-7 position of the flavonoid, the compound is bitter. However, if the rhamnose is attached to the C-2 position of the flavonoid, the compound is tasteless (R. L. Rouseff, in "Citrus Nutrition and Quality (S. Nagy and J. A. Attaway, eds.), ACS Symposium Series 143:63–65 [1980]). Thus, much research has been conducted regarding the various forms and isomers of the flavanones (see e.g., R. L. Rouseff, supra). While naringin is only slightly soluble in water, it is soluble in acetone, alcohol, and warm acetic acid.

Debittering of Juice

Both pre-harvest and processing methods have been investigated for reducing the bitterness of citrus fruit, as well as methods for debittering harvested juice, in order to improve the flavor and enhance the commercial value of the juice. The use of plant growth regulators, rootstocks and other horticultural factors (see e.g., R. F. Albach et al., J. Agric. Food Chem., 29:313–315 [1981]), as well as post-harvest fruit treatment with ethylene (V. P. Maier et al., Citrograph 56:373–375 [1971]), and the use of low pressures during juice extraction to prevent albedo disruption (J. H. Tatum and R. E. Berry, J. Food Sci., 38:1244–1246 [1973] have been studied as methods to control bitterness.

Adsorbents and ion-exchange resins have also been used. For example, activated carbon has been used to debitter orange juice. (See e.g., R. J. McColloch, Calif. Citrograph 35:290–292 [1950]; and U.S. Pat. No. 2,510,797). Polyamides have also been used (see e.g., B. V. Chandler et al., J. Food Agricult., 19:83–86 [1968]; and M. O. Nisperos and G. L. Robertson, Philip Agriculture 65:275–282 [1982]). Other adsorptive agents have also been used with varying success to debitter citrus juices, including cellulose acetate (B. V. Chandler and R. L. Johnson, J. Sci. Food Agricult., 28:875–884 [1977]), cellulose esters (B. V. Chandler and R. L. Johnson, U.S. Pat. No. 3,989,854); Florisil (C. R. Barmore et. al., J. Food Sci., 512:415–416 [1986]), cyclodextrin polymers (P. E. Shaw and B. S. Buslig, J. Agricult. Food Chem., 34:837–840 [1986]), ion exchange resins (see e.g., Kunin U.S. Pat. No. 2,681,907; Gage et al., Science 113:522–523 [1951]; and R. Couture and R. Rouseff, J. Food Sci., 57:380–384 [1992]), including polyhexamethylene adipamide and polyvinylpyrrolidone (U.S. Pat. No. 3,463,763), and styrene divinyl-benzene (SDVB) cross-linked copolymer resin (e.g., Mitchell and Pearce, U.S. Pat. No. 4,439,458).

Other methods to debitter citrus juices have included the use of ultrafiltration and adsorption (E. Hernandez et al., J. Food Sci., 57:664–670 [1992]; and M. Wethern, Trans. Citrus Engineer. Conf., ASME 37:48–66 [1991]), supercritical carbon dioxide (D. A. Kimball, J. Food Sci., 52:481–482 [1987]), immobilized enzymes (D. Dinelli and F. Morisi, French Patent No. 2,125,539; M. On et al., J. Ferment. Technol., 55:493–500 [1977]; A. C. Olson et al., J. Food Sci., 44:1538–1361 [1979]; and M. C. Gray and A. C. Olson, J. Agricult. Food Chem., 29:1298–1302 [1981]), immobilized microorganisms (S. Hasegawa, Food Biotechnol., 1:249–261 [1987]), and the use of bitterness modulators (e.g., neodiosmin)(D. G. Guadagni et al., U.S. Pat. No. 4,154,862 [1977]). The use of cellulose esters has been successful in the partial removal of flavonoids (e.g., K. S. Kealey and J. E. Kinsella, in "Critical Reviews in Food Science & Nutrition," 11:1–40 [1979]).

However, despite the large number of methods studied to remove bitterness from citrus juices, all of the previously reported methods have serious limitations. For example, carbon adsorbents are non-specific and consequently remove other components present in the juice (R. E. Berry, Proc. Intr. Soc. Citriculture, pp. 896–899 [1981]). The use of polyamides has a major drawback in that it results in the substantial loss of ascorbic acid from orange juice. In addition, the use of polyamides requires a two-stage treatment of the juice, due to the preferential adsorption of phenolic compounds by polyamines. Thus, this method is not economically viable. The methods involving the use of immobilized enzymes have been hampered by the unavailability of commercial quantities of purified enzymes, low reaction rates associated with immobilized enzymes, and the inadequate half lives of the immobilized enzymes. Methods using immobilized microorganisms also suffer from practical problems.

Thus, there remains a need in the art for a debittering method that is economical, efficient, and utilizes materials approved by governmental agencies for food processing (e.g., the Food and Drug Administration [FDA]).

SUMMARY OF THE INVENTION

The present invention is directed to the processing of citrus products, and more particularly, improved methods, compositions, and devices for the debittering of juices and other liquids and fluids. In particular, the present invention is intended for use with citrus juices for the removal of compounds that cause bitterness. While the mechanism by which such compounds are removed or the precise nature of the compounds to be removed is not necessary for successful use of the invention, it is believed that the present invention removes such compounds as limonoids and flavonoids. Thus, use of the present invention is not intended to be limited to removal of limonin and/or naringin, or to be dependent upon the precise nature of the compounds removed. In one particularly preferred embodiment, the present invention is used for the debittering of orange and grapefruit juices. However, it is contemplated that the methods of the present invention will also be useful for debittering other citrus juices, such as lemon, lime, tangerine, tangelo, mandarin oranges, and others, as well as other fruit and vegetable juices.

In one embodiment, the present invention provides methods for debittering fluid comprising the steps of: a) providing a fluid suspected of containing one or more bitterness compounds, and styrene-divinyl-benzene resin, wherein the resin is comprised of particles of about 100–200 microns in size; and b) contacting the styrene-divinyl-benzene resin with the fluid. In one embodiment of these methods, the contacting is conducted under conditions in which one or more bitterness compounds is substantially removed from the fluid. In a preferred embodiment, the styrene-divinyl-benzene resin is AMBERLITE® XAD-16. In one embodiment the bitterness compound tested in these methods is selected from the group consisting of limonin and naringin. In one preferred embodiment, the resin is contained within a radial flow column. In an alternative embodiment, the methods further comprise the step of collecting the one or more bitterness compounds removed or eluted from the resin. In a particularly preferred embodiment, the fluid is citrus juice. It is contemplated that the citrus juice used in the method of the present invention be selected from the group consisting of grapefruit juice, orange juice, tangerine juice, lemon juice, and lime juice.

In an alternative embodiment, the present invention provides methods for debittering juice comprising the steps of: a) providing a juice suspected of containing one or more bitterness compounds, and styrene-divinyl-benzene resin, wherein the resin is comprised of particles of about 100–200 microns; and b) contacting the juice to the styrene-divinyl-benzene resin, under conditions such that one or more bitterness compound binds to the styrene-divinyl-benzene resin. In one embodiment, the one or more bitterness compounds binding to the styrene-divinyl-benzene resin is selected from the group comprising limonin and naringin. In a preferred embodiment the juice is citrus juice, including, but not limited, to juices such as orange juice, grapefruit juice, lemon juice, tangerine juice, and lime juice.

In yet another alternative embodiment, the present invention provides methods for debittering citrus juice comprising the steps of: a) providing citrus juice suspected of containing one or more bitterness compounds, and styrene-divinyl-benzene resin, wherein the resin is comprised of particles of about 100–200 microns; and b) contacting the citrus juice with styrene-divinyl-benzene resin, under conditions such that one or more bitterness compound binds to the styrene-divinyl-benzene resin. In one preferred embodiment, the styrene-divinyl-benzene resin is AMBERLITE® XAD-16. In one embodiment of this method, the bitterness compound is selected from the group consisting of limonin and naringin. In a preferred embodiment, the resin is contained within a radial flow column. In a one preferred embodiment, the method further comprises the step of eluting one or more bitterness compounds from the resin. In a particularly preferred embodiment, the exposing of the citrus juice to the resin is conducted at a flow rate of greater than or equal to 0.15 bed volumes per minute. In an alternative preferred embodiment, the flow rate is 2 bed volumes per minute.

The present invention also provides a device for debittering fluid, comprising a container having a resin chamber, an opening in the resin chamber, an exit from the resin chamber, and a styrene-divinyl-benzene resin contained within the resin chamber, wherein the styrene-divinyl-benzene resin is comprised of particles of approximately 100 to 100 microns in size. In a preferred embodiment, the column of the device is a radial flow column. In an alternative embodiment, the column of the device is an axial flow column. In a particularly preferred embodiment, the styrene-divinyl-benzene resin contained within the device is AMBERLITE® XAD-16. In yet another embodiment, the device further comprises means to pump fluid through the styrene-divinyl benzene resin contained within the resin chamber.

The present invention also provides a composition comprising an SVDB resin having a particle size of approximately 100–200 microns. In one embodiment of the composition, the SVDB is AMBERLITE® XAD-16.

DESCRIPTION OF THE INVENTION

Figure 1:
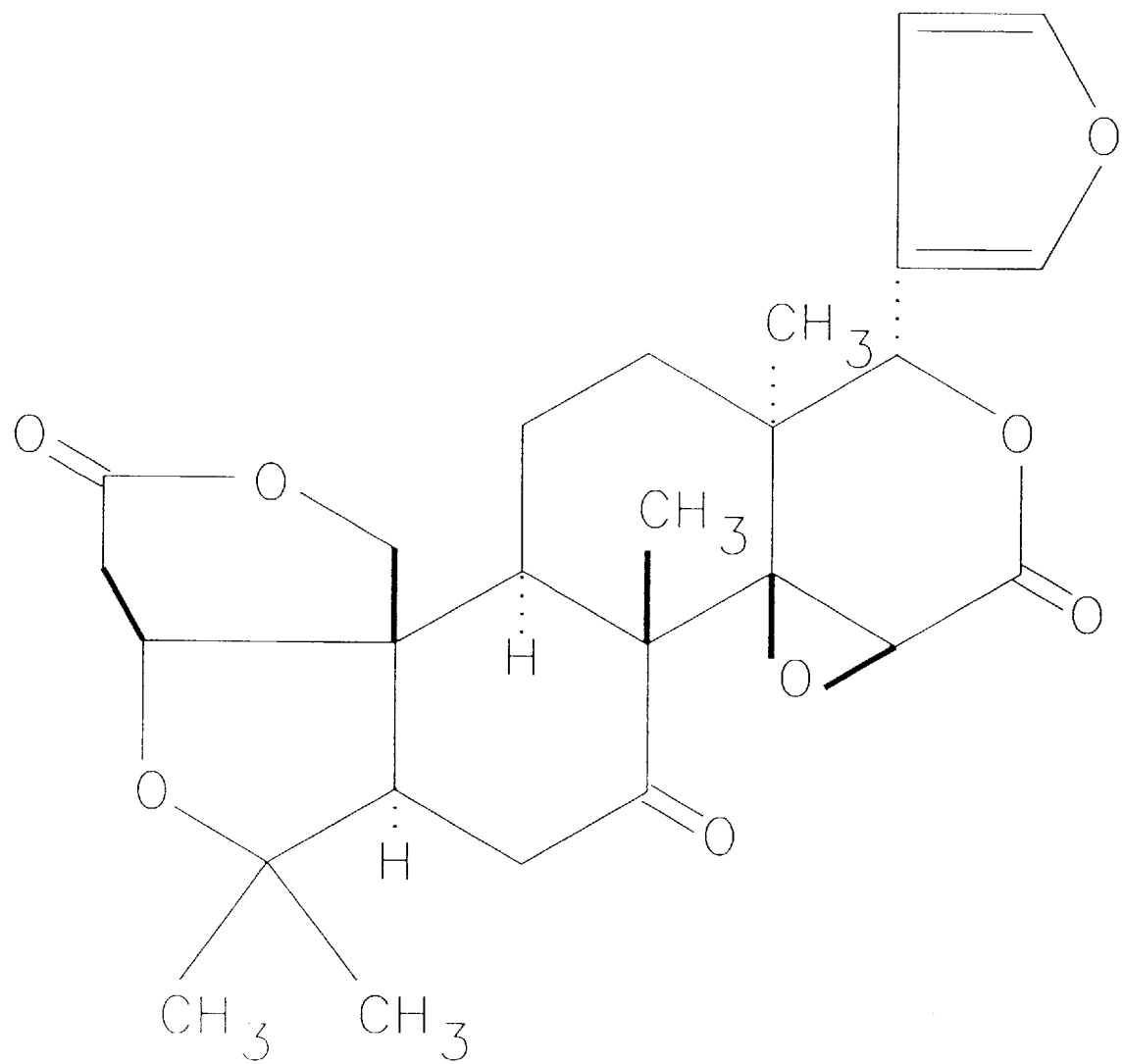
FIG. 1 shows the chemical structure of limonin.
Figure 2:
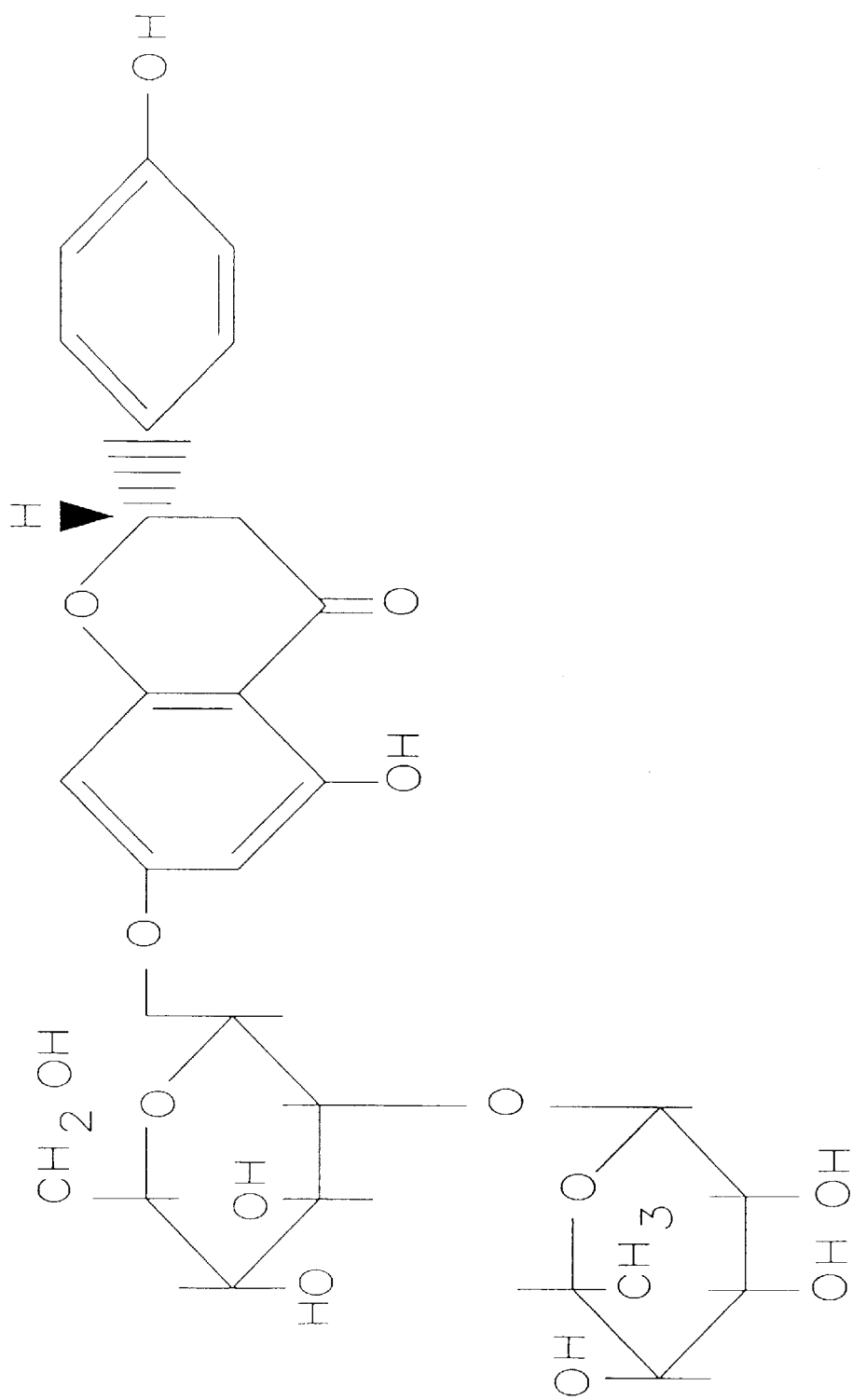
FIG. 2 shows the chemical structure of naringin.

The present invention is directed to improved methods for the processing of citrus products, and more particularly, debittering of fluids. In particular, the present invention is intended for use with citrus juices for the removal of compounds including, but not limited to, limonin and naringin. In one particularly preferred embodiment, the present invention is used for the debittering of orange and grapefruit juices. However, it is contemplated that the methods of the present invention will also be useful for debittering fluids such as other citrus juices, including juices from lemons, limes, tangerines, tangelos, and other citrus fruits, as well as other fruit and vegetable juices.

The present invention provides many significant advantages over the methods described in the prior art for the debittering of citrus juices. In particular, the present invention provides means for processing larger batch volumes of juice in a shorter amount of time than the prior art methods are capable of processing. The present invention therefore represents an efficient and economical means to debitter large volumes of citrus and other juices.

One of the advantages of the present invention include the use of commercially available, FDA-approved, styrene-divinyl-benzene (SDVB) cross-linked copolymer resin, (e.g., AMBERLITE® XAD-16) that has been modified to allow high throughput debittering of juice. Thus, in one preferred embodiment, AMBERLITE® XAD-16, commercially available from Rohm and Haas Company, and described in U.S. Pat. No. 4,297,220, herein incorporated by reference, is used as the resin. This resin is a non-ionic hydrophobic, cross-linked polystyrene divinyl benzene adsorbent resin. AMBERLITE® XAD-16 has a macroreticular structure, with both a continuous polymer phase and a continuous pore phase. In a particularly preferred embodiment, the resin used in the present invention has a particle size ranging from 100–200$\mu$.

It is contemplated that other adsorbents such as those in the AMBERLITE® XAD adsorbent series which contain hydrophobic macroreticular resin beads, with particle sizes in the range of 100–200$\mu$, will also be effective in the methods of the present invention. Moreover, different variations of the Amberlites, such as the Amberchrom® CG series of adsorbents, used with particle sizes in the range of 100–200$\mu$, may also suitable for use in the present invention. However, it is contemplated that for food and feed, the use of governmentally-approved resins in the present invention will be considered important and/or desirable.

Some of the structurally-related characteristics of the above-described adsorbents are summarized in Table 1. As shown in this Table, the polyaromatics are all polystyrene-divinylbenzene copolymers.

TABLE 1

| Resin | Chemical Nature | Mean Surface Area (m$^2$/g) | Mean Pore Diam. (Å) | Mesh Size ($\mu$m) |
|---|---|---|---|---|
| AMBERLITE ® Adsorbents - Rohm and Haas | | | | |
| XAD-2 | polyaromatic | 300 | 90 | 20–60 |
| XAD-4 | polyaromatic | 725 | 40 | 20–60 |
| XAD-7 | polymethacrylate | 450 | 90 | 20–60 |
| XAD-16 | polyaromatic | 800 | 100 | 20–60 |
| XAD-1180 | polyaromatic | 600 | 300 | 20–60 |
| XAD-2000 | polyaromatic | 580 | 42 | 20–60 |
| XAD-2010 | polyaromatic | 660 | 280 | 20–60 |
| AMBERCHROM ® Adsorbents - Toso Haas | | | | |
| CG-71m | polymethacrylate | 450–550 | 200–300 | 50–100 |
| CG-71c | polymethacrylate | 450–550 | 200–300 | 80–160 |
| CG-161m | polyaromatic | 800–950 | 110–175 | 50–100 |
| CG-161c | polyaromatic | 800–950 | 110–175 | 80–160 |
| DIAION ® //SEPABEADS ® Adsorbents - Mitsubishi Chemical | | | | |
| HP20 | polyaromatic | 500 | 300–600 | 20–60 |
| SP206 | brominated styrenic | 550 | 200–800 | 20–60 |
| SP207 | brominated styrenic | 650 | 100–300 | 20–60 |
| SP850 | polyaromatic | 1000 | 50–100 | 20–60 |
| HP2MG | polymethacrylate | 500 | 200–800 | 25–50 |
| HP20SS | polyaromatic | 500 | 300–600 | 75–150 |
| SP20MS | polyaromatic | 500 | 300–600 | 50–100 |
| DOWEX ® Adsorbents - Dow Chemical Company | | | | |
| XUS-40285 | functionalized | 800 | 25 | 20–50 |
| XUS-40323 | polyaromatic | 650 | 100 | 16–50 |
| XUS-43493 | polyaromatic | 1100 | 46 | 20–50 |

Though not limited to the use of adsorbents with any particular composition or obtained by any particular procedure, the preferred adsorbents of the present invention are polystyrene networks. The term "polystyrene network" refers broadly to polymers containing styrene ($C_6H_5CH=CH_2$) monomers; the polymers may be linear, consisting of a single covalent alkane chain with phenyl substituents, or cross-linked, generally with m- or p-phenylene residues, to form a two-dimensional polymer backbone. The polystyrene networks can be further classified, based on their mechanism of synthesis and physical and functional characteristics, as i) conventional networks and ii) hyper-crosslinked networks. The conventional networks are primarily styrene-divinylbenzene copolymers in which divinylbenzene (DVB) serves as the crosslinking agent (i.e., the agent that links linear polystyrene chains together).

In recent years, the use of styrene-divinyl benzene (SDVB) resins for debittering citrus juices has received attention because of the resin's reported capacity and life-cycle advantages. For example, Johnson and Chandler (R. L. Johnson and B. V. Chandler, J. Sci. Food Agricult., 36:48–484 [1985] and R. L. Johnson and B. V. Chandler, Food Technol., 42:130–137 [1988]), and Matthews et al. (R. F. Matthews et al., Food Technol. 44:130–132 [1990]) studied the debittering capacities of SDVB resins with different specific areas and pore diameter. Manlan et. al. (M. Manlan et al, J. Food Sci., 55:440–449 [1990]) studied the effect of cross-linkage, porosity, pore diameter, pore volume, and specific area of adsorption of limonin and naringin from grapefruit juice. However, unlike the present invention, none of these references describe the resin particle size as being a critical factor in the debittering citrus juice and high throughput during debittering process. Thus, in contrast to the resin particle size of the present invention (e.g., 100–200μ), these other references describe methods which use particle sizes that are much greater (e.g., 300–1200μ, as described by Puri in U.S. Pat. No. 4,439,458, herein incorporated by reference).

Also, in contrast to the present invention, previously reported methods utilizing SDVB matrices have severe flow limitations; they cannot be used at a level above 0.25 bed volume (BV)/minute. For example, the method described by Puri (U.S. Pat. No. 4,439,458), processed grapefruit juice through the Duolite S-861 column at a maximum flow rate of 0.11 BV/min. Likewise, Mitchell et. al. (U.S. Pat. No. 4,514,427) reported maximum flow rate of 0.1 BV/min (1.2 gpm/ft3) for debittering grapefruit juice using Dowex resin. In addition, the flow rate achieved by Hernandez et al., using AMBERLITE® XAD-16 to debitter grapefruit juice and pulp wash was only 0.17 BV/min (Hernandez et al., J. Food Sci., 57:664–670 [1992]).

In contrast to the previously reported methods, the relatively small particle size used in the methods of the present invention allows for a much higher throughput level (i.e., much greater flow rates were achieved, allowing for the processing of greater volumes of liquid in shorter time periods). However, it was determined during the development of the present invention that resin particle sizes of approximately 38–75μ suffered from slow flow rates and high back pressures. Thus, in the preferred embodiment, the particle size of the resin used in the methods of the present invention is approximately 100–200μ.

By providing a means to maximize the throughput capability of the debittering process, while taking advantage of the resin's ability to remove bitterness-causing compounds such as limonin and naringin, the present invention solves many long-felt needs in the art of juice production. In addition, due to the high throughput capabilities, the present invention facilitates the more rapid processing of juices, thereby decreasing the time required for processing, and allowing for an increase in the shelf life of the finished product.

Definitions

To facilitate understanding of the invention, a number of terms are defined below.

As used herein, the terms "fluid" and "solution" are used in reference to any liquid. It is not intended that the present invention be limited to any particular fluid or solution. As used herein, the term "juice" is used in reference to any liquid extracted from a solid material (e.g., fruits or vegetables) used for nutrition of humans and/or other animals. It is not intended that the invention be limited to any particular juice. Rather, it is contemplated that various juices will be used with the present invention, including, but not limited to, citrus juices, other fruit juices, and vegetable juices. As used herein, the term "citrus juice" is used in reference to the juice obtained from fruit commonly referred to as "citrus fruits." It is contemplated that the term encompass all types of citrus juices, including but not limited to orange, grapefruit, tangerine, lemon, tangelo, lime, pomelo, pumelo, pommelo, pompelmous, shaddock, mandarin oranges, etc. It is also not intended that the present invention be limited to any particular variety of citrus fruit or juice. For example, it is intended that the invention be used with sweet orange, bitter (i.e., Seville or bigarade), bergamot, and other orange varieties.

As used herein, the term "bitterness compound" is used in reference to any compound that renders juice or fluid bitter to the taste. It is intended that this term include, but not limited to such compounds as limonoids and flavonoids.

As used herein, the term "limonoid," is used in reference to those compounds included within the group of compounds commonly referred to as "limonoid," including but not limited to those compounds often found in citrus species, such as limonin, nomilin, and other compounds.

As used herein, the term "flavonoid" is used in reference to those compounds included within the group of compounds commonly referred to as "flavonoids," including but not limited to those compounds often found in citrus species, such as naringin and hesperidin.

As used herein, the term "food" is used in reference to any solid, liquid, semi-solid or other material that is used for the nutrition of living things. The term includes any substance that can be taken into the body of an animal or plant to maintain its life and/or growth. It is not intended that the term be limited to any particular type of food. Indeed, it is contemplated that liquid materials (e.g., "drinks") such as juices, and in particular citrus juices be included within the definition. It is also contemplated that the term encompass materials that are used as supplements or additives to other foods. For example, it is intended that the term encompass supplements or additives that are added to a drink in order to provide additional nutritional value to the drink.

As used herein, the terms "feed" and "feedstuff" are used in reference to food that is intended for the nutrition of animals other than humans. It is not intended that the terms be limited to any particular type of feed, and may include any solid, liquid, semi-solid, or other material that is used to maintain the life and/or growth of non-human animals. It is contemplated that the term include materials used as feed for commercially valuable animals such as livestock (e.g., cattle, sheep, goats, hogs, horses, lagomorphs, etc.), as well as companion animals (e.g., dogs, cats, horses, rodents, lagomorphs, etc.), and laboratory animals (e.g., non-human primates, rodents, lagomorphs, etc.). Thus, it is not intended that the term be limited to materials fed to any particular genus, species, breed, variety, or type of non-human animal.

As used herein, the term "sample" is used in reference to any material of interest that is treated or analyzed using the present invention. Thus, it is contemplated that the term encompass the starting material analyzed or treated using the present invention. For example, the term "sample" encompasses the material that is contacted with a resin in an embodiment of the present invention. It is also contemplated that the term will encompass a portion or aliquot of a larger quantity of a particular substance. However, it is also contemplated that the term encompass any quantity of material treated using the present invention.

As used herein, the term "resin" is used in reference to semisolid or solid amorphous organic compounds of vegetable, synthetic, or other origin. It is contemplated that the term be used in reference to materials commonly used in chromatographic (i.e., separation) procedures. It is also contemplated that the term be used in reference to materials such as polymeric adsorbents used to adsorb particular chemical compounds from a sample.

The term "resin" is also used in reference to a solid support (such as beads/particles etc.) capable of interacting and binding various compounds, including bitterness compounds, in a solution or fluid (e.g., citrus juice), thereby removing the bitterness compounds. The removal process is not limited to any particular mechanism. For example, bitterness compounds may be removed by an adsorbent or by charge (i.e., affinity interaction). The term "adsorbent resin" refers broadly to both natural organic and synthetic substances. Various adsorbent resins have differing characteristics, including different particle sizes, surface areas, pore sizes, chemical natures (e.g., polystyrene divinylbenzene and acrylic ester), polarities, etc., in order to to allow optimum performance for particular applications (e.g., adsorption of bitterness compounds). The adsorbent resins may be packaged in a number of arrangements. It is contemplated that the adsorbent resin be packed in a chromatography column for use in the present invention.

The term "polymer" refers broadly to a material made up of a chain of identical, repeated "base units". The term encompasses materials containing styrene (i.e., $C_6H_5CH=CH_2$) monomers, which may be referred to as "polystyrene networks."

The term "crosslinked" refers broadly to linear molecules that are attached to each other to form a two- or three-dimensional network. For example, divinylbenzene (DVB) serves as the crosslinking agent in the formation of styrene-divinylbenzene copolymers. The term also encompasses "hypercrosslinking" in which hypercrosslinked networks are produced by crosslinking linear polystyrene chains either in solution or in a swollen state with bifunctional agents.

As used herein, the term "SDVB" is used in reference to styrene-divinyl-benzene. It is intended that this term encompass any compound such as a chromatography resin that is composed of this compound. In a particularly preferred embodiment, the SDVB of the present invention is comprised of cross-linked copolymer adsorbent SDVB resins that are commercially available. In an alternative preferred embodiment, the SDVB resins are approved for contact with food and/or feed materials by the Food and Drug Administration (FDA).

As used herein, the term "chromatography" is used to refer to the separation of compound(s) of interest from a sample solution or fluid that contains a mixture of compounds. It is contemplated that in some embodiments, the compound of interest that is separated using chromatography materials and methods will be collected (i.e., harvested) and used in any suitable application. It is also contemplated that the term encompass the separation of mixed substances (e.g., a solution) by the passage of the mixed substances through an adsorbing medium. In a preferred embodiment, "chromatography" is used in reference to the passage of a mixture through an adsorbing medium such as a resin suitable for chromatography.

As used herein, the term "chromatography column" or "column" is used in reference to any type of column design that is used for chromatography. Thus, it is contemplated that any type of chromatography column or method suitable for use with liquids or fluids will be used successfully in the present invention. For example, it is contemplated that columns designed for axial, vertical, spiral, as well as radial or horizontal chromatography flow of sample fluids or liquids through the column will be used in the methods of the present invention and/or with the materials of the present invention. It is contemplated that columns such as those disclosed in U.S. Pat. Nos. 3,422,605, 3,453,811, 3,780,866, 4,133,562, 4,354,932, as well as the RFC columns disclosed in U.S. Pat. Nos. 4,865,729, 4,676,898, 4,627,918, and 5,452,659, herein incorporated by reference, will be used successfully in the present invention.

As used herein, the term "RFC" is used in reference to a chromatography column that is characterized as having radial or horizontal flow. It is not contemplated that the present invention be limited to any particular RFC format, size, or shape. Indeed, it is contemplated that cylindrical, conical, and tubular, as well as wedge-shaped (i.e., triangular), and/or other shapes will be successfully used in the present invention. It is also contemplated that any styrene-divinyl benzene resin suitable for radial flow chromatography will be used in the radial flow chromatography embodiment of the present invention.

As used herein, the terms "bed volume" and "column volume" are used interchangeably in reference to the volume of resin packed into a chromatography column. The term "bed volume" is also used in reference to a volume of liquid or fluid (e.g., juice, water, solvent, etc.), added to a column in a volume that is equal to the volume of resin present in the column. For example, one bed volume may be expressed as "1 BV=1 $m^3$ solution per $m^3$ resin."

As used herein, the term "bed volume per minute" (or "BV/min") is used in reference to the number of bed volume equivalents of fluid that will pass through the bed volume during a one minute period. Thus, the term provides a "flow rate," which indicates that fluid is passed through the column at a certain rate of flow. Thus, as used herein, the term "flow rate" is used in reference to the speed at which a fluid or liquid (e.g., juice, water, solvent, etc.) passes through the resin present in a packed chromatography column. For example, if the flow rate for a particular column and sample fluid is indicated as being one bed volume per minute, this means that the sample fluid passes through the column at a flow rate of 1 BV/minute throughout the chromatography process.

As used herein, the term "breakthrough" is used in reference to situations in which compounds to be removed from a fluid are not removed. For example, breakthrough occurs during chromatography when the resin is incapable of binding the compound to be removed and the compound remains in the fluid sample used in the column. Breakthrough of the compound usually starts when the resin becomes saturated with the compound. The occurrence of breakthrough is potentially the result of numerous variables, including, but not limited to, the flow rate, pH, ionic strength of the sample and/or buffer, and the presence of compounds other than the compound of interest in the sample fluid.

Column chromatography procedures are commonly terminated at a breakthrough level of 10–20%, as the end product of the procedure is usually judged as containing an excess of the compound to be removed. For example, at 20% breakthrough, the quality of the end-product (e.g., juice) may be too low for the product to be acceptable. Although breakthrough values of 10–20% are commonly used in the art, in some instances, breakthrough values that are much higher (e.g., 50%) are acceptable, as long as the overall concentration of the undesirable compound is satisfactory. Thus, for citrus juices, a breakthrough value greater than 20% may be acceptable, as long as the concentration of bitterness compound is sufficiently low that the quality of the end product (e.g., debittered juice obtained from multiple runs and pooled into one batch) obtained is satisfactory.

As used herein, the term "substantially removed," is used in reference to the removal of a large percentage of a compound desired to be removed. It is contemplated that this term encompass the removal of sufficient bitterness compound such that Food and Drug and Citrus regulations (e.g., the regulations of the Florida Department of Citrus) will be met. For example, the Florida Department of Citrus regulations indicated that grade A grapefruit juice produced in Florida between 1 August and 1 December must contain less than 600 ppm naringin or less than 7 ppm limonin (R. F. Matthews et al., supra). It is further contemplated that the term encompass removal of bitterness compounds from citrus juices such that bitterness is not detected in sensory tests (i.e., taste tests). Thus, it is contemplated that substantial removal of bitterness compounds from citrus juices is achieved at the point that objectionable bitterness cannot be tasted in juices tested by humans.

For example, it is contemplated that the present invention allows for the removal of 5–6 grams of naringin per 100 ml of wet resin. It is thus contemplated that a 100 ml volume of wet resin, containing an approximately moisture content of 60%, will have the capacity to remove 5–6 grams of bitterness compound (e.g., naringin). It is thus contemplated that the removal of naringin will approximate 5–6 g/liter of fluid or 5000–6000 ppm, with 1 ppm being the equivalent of 1 mg/l.

As used herein, the term "single strength" is used in reference to juice or other liquid that has not undergone any concentration procedures. For fruit juices, the term is used in reference to the strength of juice directly obtained from fresh fruit (i.e., prior to any treatment other than extraction of the juice from the fruit) or juice of an equivalent strength. It is contemplated that single strength juice be prepared by any means, including direct extraction from fruit, dilution of concentrated juices, and any other means commonly used in the art.

EXPERIMENTAL

The following examples are provided in order to demonstrate and further illustrate certain preferred embodiments and aspects of the present invention and are not to be construed as limiting the scope thereof.

In the experimental disclosure which follows, the following abbreviations apply: eq (equivalents); M (Molar); $\mu$M (micromolar); N (Normal); mol (moles); mmol (millimoles); $\mu$mol (micromoles); nmol (nanomoles); g (grams); mg (milligrams); $\mu$g (micrograms); ng (nanograms); l or L (liters); ml (milliliters); $\mu$l (microliters); cm (centimeters); $\mu$ (micron); mm (millimeters); $\mu$m (micrometers); nm (nanometers); °C. (degrees Centigrade); ppm (parts per million); gpm (gallons per minute); bv and BV (bed volume); CV and cv (column volume); Rohm and Haas (Rohm and Haas, Philadelphia, Pa.); VWR (VWR Scientific, Westchester, Pa.); Sigma (Sigma Chemicals, St. Louis, Mo.); and RFC (radial flow column).

EXAMPLE 1

Preparation of Columns

In this Example, AMBERLITE® XAD-16 (Rohm and Haas) was used to debitter citrus fruit juice. This resin was chosen for this Example, as it has been approved by the FDA under 21 CFR 173.65 for use with food.

In this Example, aliquots of AMBERLITE® XAD-16 resin were packed into an axial column (1.5 cm×20 cm; bed volume of 33 ml) and a wedge-shaped RFC column (bed volume of 50 ml). In this experiment, various resin particle sizes were tested. For example, columns were packed with the resin as it provided by the manufacturer (ie., with a particle size of 300–1200 ), as well as resin that was ground into various particle sizes ranging from 38–200$\mu$. The ground resin was produced by dehydrating the AMBERLITE® XAD-16 resin at 60° C. for 16 hours, and then grinding the resin in a coffee grinder ("Fast-Touch" coffee mill, Krups) for a 15 second burst followed by a 10 second burst. Different particle sizes ranging from 38–200$\mu$ were separated into discrete groups by using a standard molecular sieve (VWR). After packing in the columns, the resins were preconditioned by passing 5 bed volumes (BV) of 95% ethanol, followed by 5 BV of distilled water, 5 BV of 0.5M NaOH, 5 BV of distilled water, 5 BV of 0.5M HCl, and 5 BV of distilled water through the columns.

In addition to the AMBERLITE® XAD-16 resin, AMBERLITE® IRA-95 was also tested for its ability to debitter juice. AMBERLITE IRA-95 (Rohm & Haas) has a base matrix styrene divinyl benzene copolymer, with a tertiary amine as the functional group. The resin is a weak base anion exchanger, with a particle size of 350–400$\mu$.

In this Example, the AMBERLITE IRA-95 was packed into an axial column (1.5 cm×20 cm; bed volume of 33 ml). After packing this column, the resin was preconditioned by passing 5 bed volumes (BV) of 95% ethanol, followed by 5 BV of distilled water, 5 BV of 0.5M NaOH, 5 BV of distilled water, 5 BV of 0.5M HCl, and 5 BV of distilled water through the column.

EXAMPLE 2

Preparation of Juice

In this Example, juice was extracted from grapefruits in preparation for debittering the juice. Ruby grapefruits were obtained from the Shield's Date Garden, Indio, Calif., during January–April 1996. Each grapefruit, excluding the rind, was sliced and equal amount of distilled water was added. Juice was extracted from the fruit using Waring Commercial Laboratory Blender and kept at room temperature for 30-min with magnetic stirring and then centrifuged at 5000 rpm for 10-min at room temperature. The supernatant was collected and filtered through a 40$\mu$ filter to remove large suspended particles.

Although these Ruby grapefruits from Shield's Date Garden represented the majority of the fruit tested, additional grapefruits obtained from local supermarkets were also tested using the debittering process of the present invention. The results obtained with all of the grapefruits tested were similar.

EXAMPLE 3

Debittering of Juice

In this Example, the columns prepared in Example 1 were used to debitter the supernatant (i.e., juice) obtained as described in Example 2. In this Example, various flow rates, ranging from 0.15 BV to 2 BV/min were used with the AMBERLITE® XAD-16. For all of the columns, the first bed volume was discarded as it consisted of water. The samples tested in this Example consisted of successive 4 to 6 bed volumes, totally approximately 36–40 bed volumes of juice tested. With the AMBERLITE® IRA-95 resin, a total of approximately 20 bed volumes of juice were tested, at a flow rate of 0.15 BV/min.

Following each run of the debittering process, the columns were cleaned using 95% ethanol, followed by 5 bed volumes of distilled water, 5 bed volumes of 0.5M NaOH, 5 bed volumes of distilled water, 5 bed volumes of 0.5M HCl, and 5 bed volumes of distilled water. The 0.5M HCl and 0.5M NaOH used in this cleaning process were chosen because they neutralize each other and make the cleaning process environmentally friendly. The ethanol was recovered using a Bucki/Brinkman rotary evaporator equipped with a distillation unit (VWR). The recovered ethanol was saved and used in subsequent cleaning runs. Samples of cleaning solutions from each of the fifth bed volumes used in these wash steps were tested for the presence of naringin as described in Example 4. The columns were only reused if there was no detectable naringin in the acid and distilled water washes.

Figure 3:
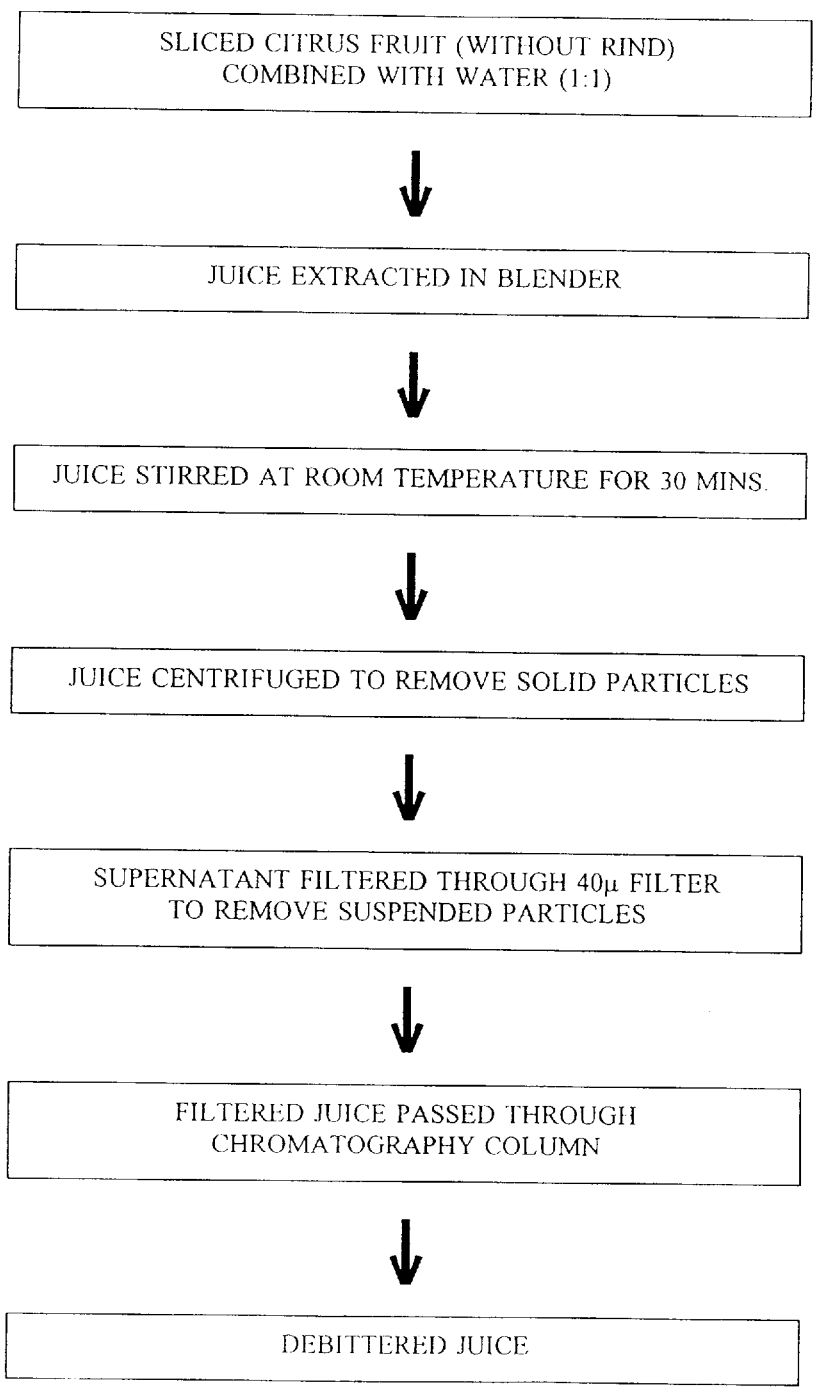
FIG. 3 is a schematic of the debittering process of the present invention.

FIG. 3 is a schematic of the debittering process, including the steps of preparing the fruit (i.e., Example 2), through the production of debittered juice. Following the debittering process, the bitter compounds (limonin and naringin) were eluted from the column using 95% ethanol. These analyses are described in the following examples. The bitter compounds harvested from these columns may be used as a flavoring compound for food and/or feed.

It is contemplated that the method described in this Example will be modified according to the needs of the user. For example, it is intended that the column sizes and volumes will be modified so as to permit the large scale processing of juice necessary in the citrus juice industry. As the values provided in these Examples are expressed in terms of the bed volumes used, rather than the absolute volumes used in individual experiments, it is contemplated that the process will be scaled up or down to any volume desired. Thus, large-scale processing of juice by use of this invention is possible by utilizing the bed volumes and maintaining the ratios as needed, based on these Examples.

EXAMPLE 4

Analysis of Naringin

In this Example, juice treated using the methods of the present invention was tested for its naringin concentration using the method described by Hendrickson et al., (R. Hendrickson et al., Proc. Florida Hort. Soc., 71:194–198 [1958]).

Briefly, test samples of untreated grapefruit juice and juice debittered according to the methods of Example 3 were tested by for their naringin concentration. For each test, 0.1 ml of juice was mixed with 9.9 ml isopropanol (VWR). The mixture was kept at room temperature for 2 hours and then filtered through Whatman #42 filter paper. The filtered solution was then evaluated for its naringin concentration using a LKB Biochrom Ultrospec 4050 spectrophotometer at 284 nm. A sample of isopropanol was used as a blank control. The naringin concentrations obtained from the test samples were compared with a standard curve prepared using solid naringin (Sigma), in which the solid naringin was either dispersed in isopropanol and processed as described for the test samples, or solid naringin was mixed with juice and then processed as described above for the test samples. The standard curve was linear within the range of 10–30 ppm naringin. The absorbance at 284 nm was between 0.264 and 0.800.

Figure 4:
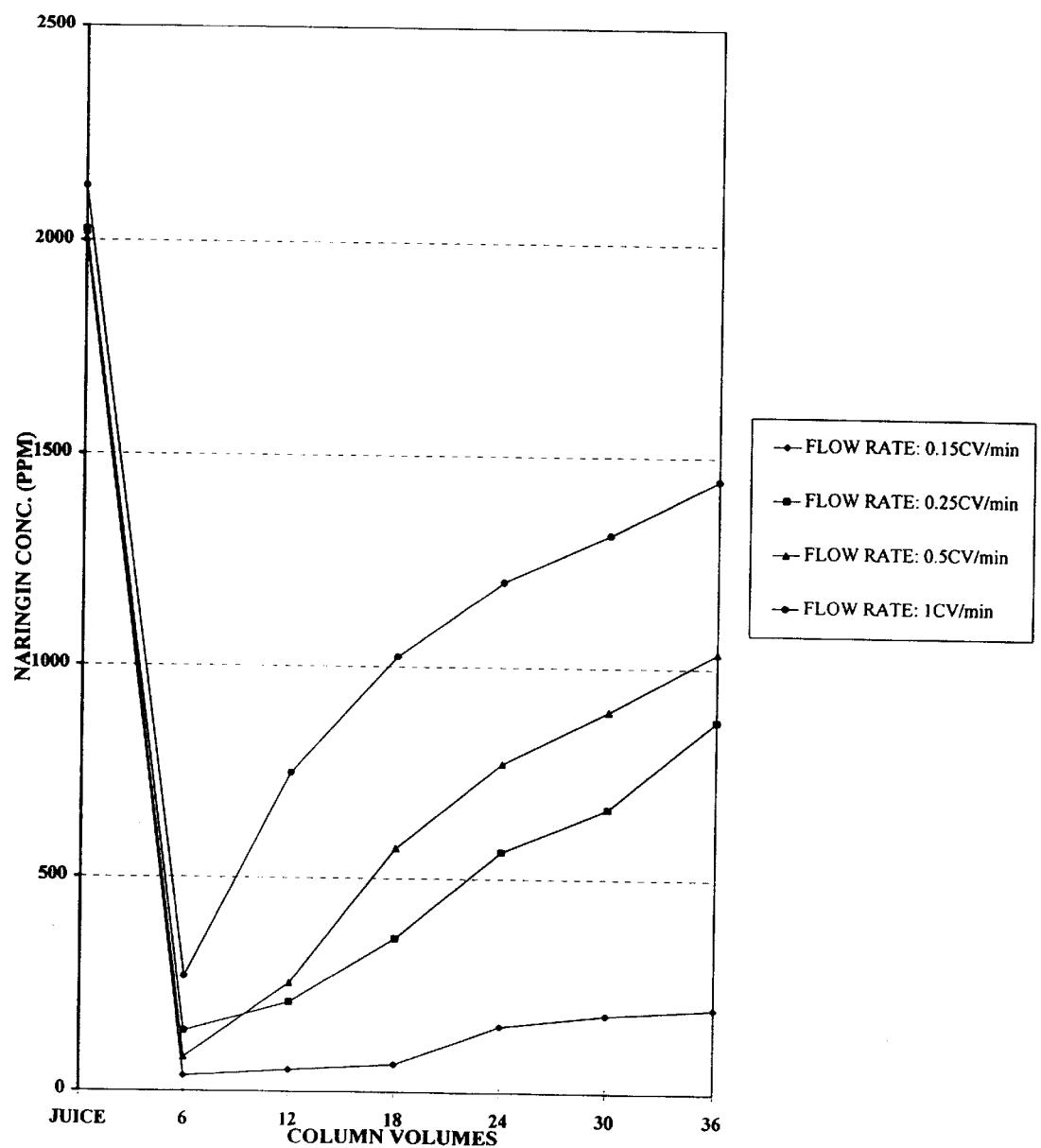
FIG. 4 shows the naringin concentration of grapefruit juice debittered using AMBERLITE® XAD-16 particle sizes of 300–1200$\mu$.
Figure 5:
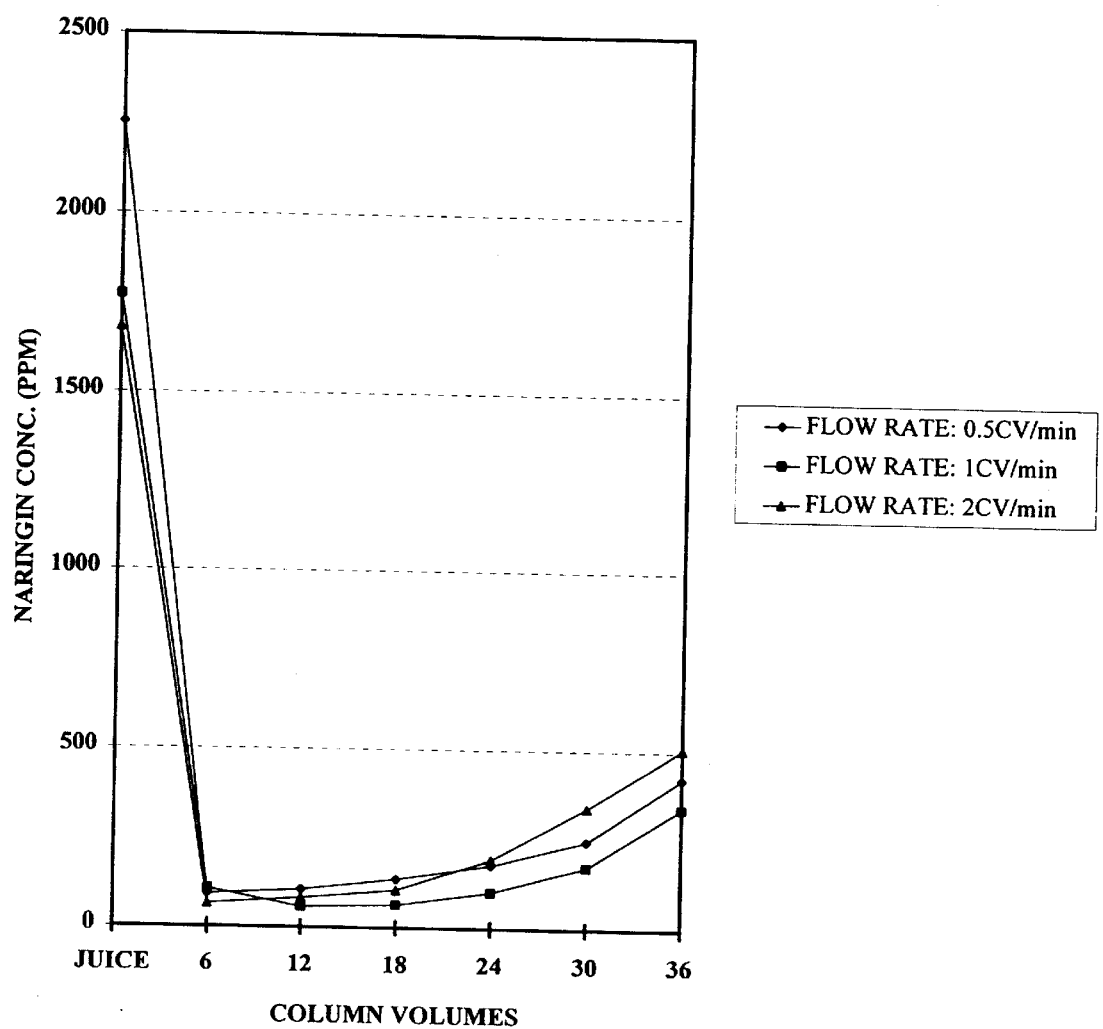
FIG. 5 shows the naringin concentration grapefruit juice debittered using AMBERLITE® XAD-16 particle sizes of 100–200$\mu$.

FIGS. 4 and 5 show the results of this analysis. FIG. 4 shows the naringin concentrations in juice eluted through the axial column prepared in Example 1 (1.5 cm×20 cm; BV / 33 mL) packed with commercially available AMBERLITE® XAD-16, with a particle size of 300–1200μ. As shown in this Figure, at a very slow flow rate (i.e., 0.15 BV/min), the resin effectively removed bitterness in the form of naringin, even after 36 BV of juice was passed through the column. For example, after 6 BV of juice was passed through the column very little naringin was detected. This result is consistent with the results reported by Puri and Mitchell et al. (U.S. Pat. Nos. 4,439,458 and 4,514,427, respectively).

However, as also shown in FIG. 4, at flow rates above 0.25 BV/min, 20% breakthrough of naringin started earlier than 36 BV. For example, flow rate of 0.25 BV/min, 20% breakthrough started when 24 BV of juice was passed through the column, while at a flow rate of 0.5 BV/min, 20% breakthrough started when 18 BV of juice was passed through the column. At a flow rate of 1 BV/min, 20% breakthrough started after only 12 BV of juice was passed through the column.

In contrast, debittering of grapefruit juice was found in this Example to be possible with ground AMBERLITE® XAD-16 of a particle size 100–200μ, at a flow rate even faster than 2 BV/min in the same axial column format. These results are shown in FIG. 5. In this experiment, at a flow rate of 2 BV/min, 20% breakthrough of naringin started after 30 BV of juice was passed through the column.

Figure 6:
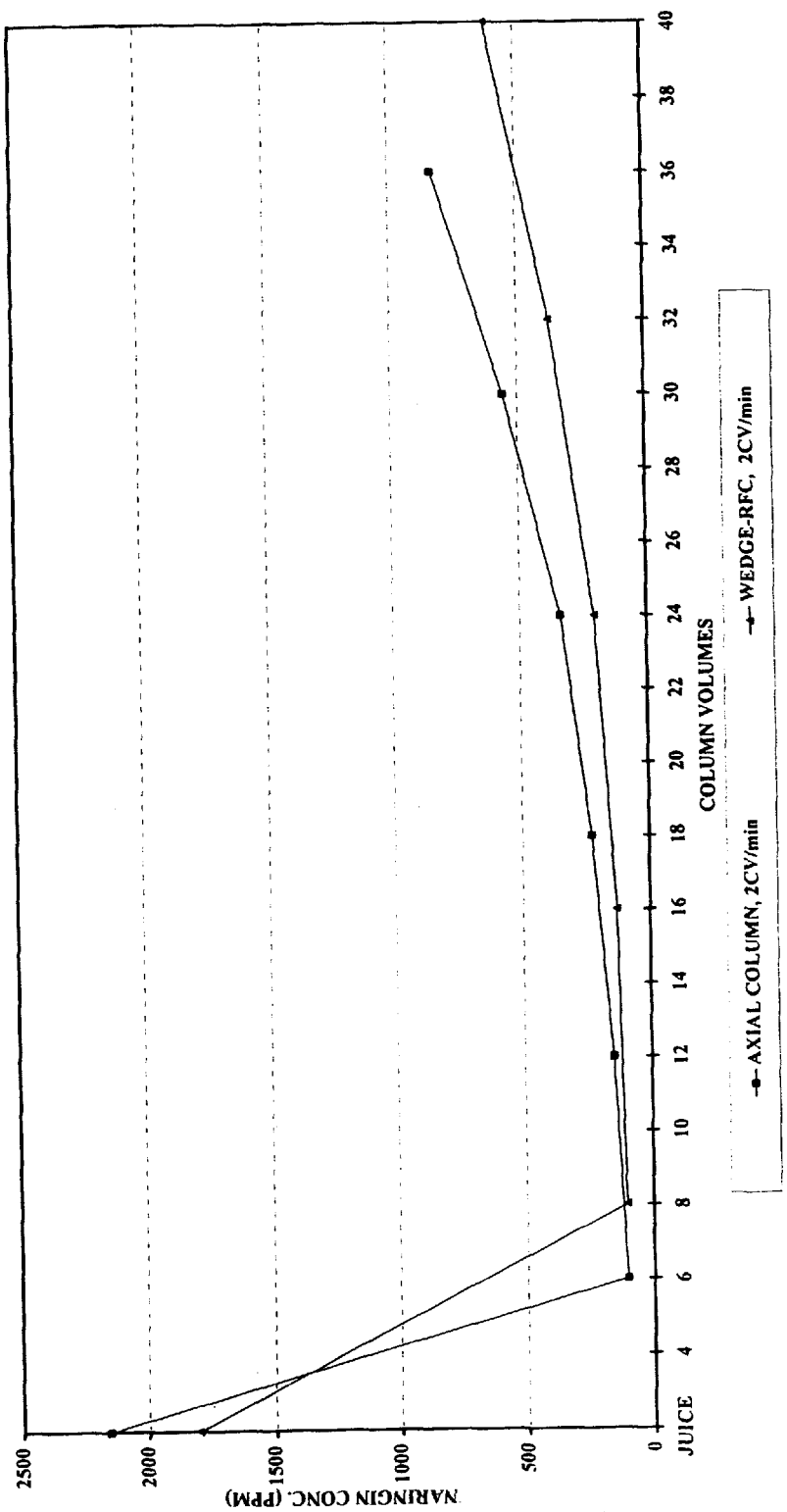
FIG. 6 shows a comparison between axial and RFC columns for debittering of grapefruit juice.

In addition to the exceptional results obtained with the axial column packed with ground AMBERLITE® XAD-16 of a particle size 100–200μ, the wedge RFC columns prepared as in Example 1, performed even better. In this experiment, at 2 BV/min, 20% breakthrough started when 40 BV of juice was passed (FIG. 6). As shown in FIGS. 4–6, resin particle sizes of approximately 100–200 11 were exceptionally suited for debittering citrus juice, while use of particle sizes of 38–75μ resulted slow flow rates (i.e., less than 0.5 BV/min) and high back pressures (i.e., above 15 psi). Because of the slow flow rate and high back pressure, the juice tested with the column packed with resins having particle sizes ranging from 38–75μ was considered to be unsatisfactory. No additional testing was conducted on this juice.

Figure 7:
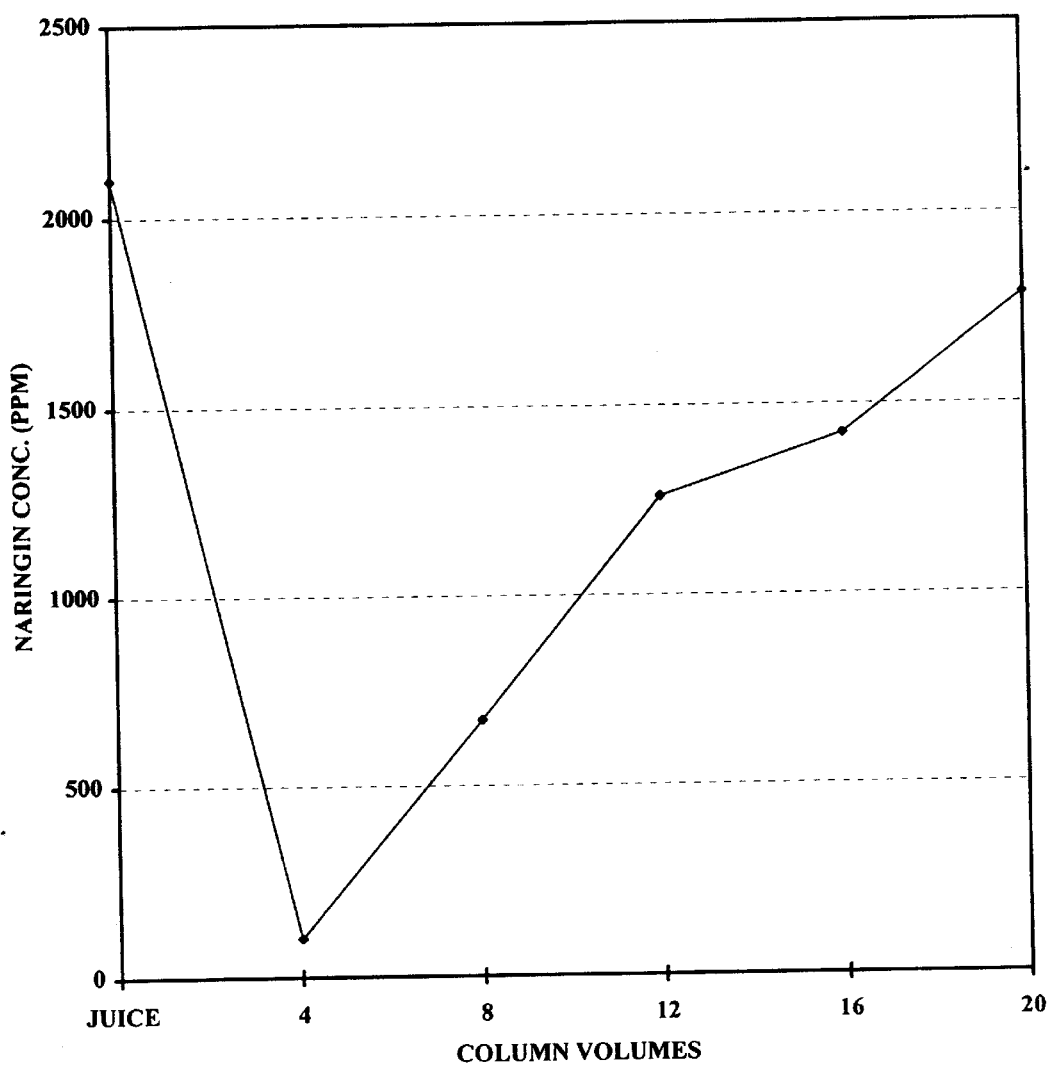
FIG. 7 shows the naringin concentration of grapefruit juice debittered using the AMBERLITE IRA-95 resin.

For the AMBERLITE IRA-95 resin, the maximum flow rate possible was very low (0.15 BV/min). Also, 20% breakthrough was observed after only seven BV's of juice. Finally, the juice produced after treatment with the IRA-95 resin was coagulated due to the removal of acid from the juice. FIG. 7 is a graph showing the results of the naringin concentration determinations obtained with this resin. As shown on this Figure, for 8 BV and greater, the naringen concentrations too high to meet the Florida Citrus Department regulations for the maximum concentration of naringin allowed in grapefruit juice (i.e., 600 ppm naringin). Thus, the IRA-95 was resin was determined to be unsatisfactory for the debittering of citrus juice according to the present invention.

In sum, this Experiment shows that with AMBERLITE XAD-16 of particle size 300–1200μ, juice could not be processed using a high flow rate (ie., above 0.15 BV/min). At this particle size, the capacity decreased as the flow rate increased, as shown in FIG. 4. In contrast, using the methods of the present invention, (i.e., AMBERLITE XAD-16 with particle size of 100–200μ), a very high flow rate (e.g., 2 BV/min) was possible without the concomitant sacrifice in the capacity of the resin, as shown in FIG. 5. In addition, small particle sizes (e.g., 38–75μ) were also found to be unsatisfactory, as was an alternate resin (AMBERLITE IRA-95).

EXAMPLE 5

Analysis of Vitamin C

In this Example, juice treated using the methods of the present invention was tested for its vitamin C content using the method described by Plummer (D. T. Plummer, *An Introduction to Practical Biochemistry,*" McGraw-Hill Book Co., UK, pp. 318–319 [1978]).

Briefly, a stock of 2,6 dichlorophenolindophenol solution was prepared by dissolving 100 mg powdered 2,6 dichlorophenolindophenol (Sigma) in 100 ml distilled water. Working dye solution was then prepared from this stock at a concentration of 2 mg/ml 2,6 dichlorophenolindophenol. Stock ascorbic acid solution was also prepared by dissolving 100 mg ascorbic acid powder (Sigma) in 100 ml distilled water. A working ascorbic acid solution standard was then prepared from this stock at a concentration of 2 mg/100 mil ascorbic acid.

To analyze the vitamin C content of debittered and untreated juice, test samples were prepared by mixing 5 ml of diluted juice (1:10 dilution of juice prepared in distilled water) and 1 ml glacial acetic acid (VWR). The juice was titrated with working dye solution until a faint permanent pink color was produced. The burette readings were recorded (T).

The titrations were also conducted with a blank control (5 ml distilled water and 1 ml acetic acid), and with a standardized ascorbic acid solution (5 ml ascorbic acid [2 mg/100 ml]) and 1 ml acetic acid). These burette readings were also recorded, with the blank value given the designation "B1," and the standard solution given the designation "St.". The vitamin C content of the juice samples were determined using the formula:

Vitamin C of test (mg/100 ml)=(T-B1/St-B1)×2×dilution factor.

The vitamin C concentration of untreated grapefruit juice was approximately 19 mg/100 ml. The vitamin C concentration of most of the grapefruit juice samples debittered according to the present invention was approximately 16 mg/100 ml juice. Thus, the approximate decrease in vitamin C content was about 16%. Thus, the loss of vitamin C in this process was less than that obtained by other researchers (see e.g., R. Couture and R. Rouseff, J. Food Sci, 57:380–384 [1992]).

EXAMPLE 6

Sensory Detection of Bitterness

Samples from each run were tested by a six-member panel of tasters. Using the 100–200µ particle size AMBERLITE® XAD-16 resin to debitter grapefruit juice as described in the above Examples, no bitter taste was detected in samples of pooled grapefruit juice in samples from 21–30 CV (ie., where 20% breakthrough was found to begin). Although bitterness was detected in samples at 31 CV and higher, the bitterness was less than that detected in the original, untreated juice sample. Thus, even at higher column values and therefore, breakthrough levels that are relatively high, the present invention is useful for the production of a product with bitterness that has been minimized.

It is clear that the present invention as described above and exemplified in the Examples above, provides much improved methods for debittering fluids, in particular juices. It is not intended that the present invention be limited to a particular juice. Indeed, it is intended that the present invention be used with all citrus juices, as well as any other juice which contains at least one compound that renders the juice bitter.

We claim:
1. A method for debittering fluid comprising the steps of:
   a) providing:
      i) a fluid suspected of containing one or more bitterness compounds, and
      ii) an adsorbent styrene-divinyl-benzene resin, wherein said adsorbent styrene-divinyl-benzene resin is comprised of particles of about 100–200 microns; and
   b) contacting said adsorbent styrene-divinyl-benzene resin with said fluid.
2. The method of claim 1, wherein said contacting is conducted under conditions in which said one or more bitterness compounds is substantially removed from said fluid.
3. The method of claim 1, wherein said adsorbent styrene-divinyl-benzene resin comprises a non-ionic, hydrophobic cross-linked resin.
4. The method of claim 1, wherein said bitterness compound is selected from the group consisting of limonin and naringin.
5. The method of claim 1, wherein said adsorbent styrene-divinyl-benzene resin is contained within a radial flow column.
6. The method of claim 1, further comprising the step of collecting said one or more bitterness compounds eluted from said adsorbent styrene-divinyl-benzene resin.
7. The method of claim 1, wherein said fluid is citrus juice.
8. The method of claim 7, wherein said citrus juice is selected from the group consisting of grapefruit juice, orange juice, tangerine juice, lemon juice, and lime juice.
9. A method for debittering juice comprising the steps of:
   a) providing:
      i) a juice suspected of containing one or more bitterness compounds, and
      ii) an adsorbent styrene-divinyl-benzene resin lacking functional groups, wherein said adsorbent styrene-divinyl-benzene resin is comprised of particles of about 100–200 microns; and
   b) contacting said adsorbent styrene-divinyl-benzene resin, under conditions such that said one or more bitterness compound binds to said adsorbent styrene-divinyl-benzene resin.
10. The method of claim 9, wherein said one or more bitterness compounds is selected from the group comprising limonin and naringin.
11. The method of claim 9, wherein said juice is citrus juice.
12. The method of claim 11, wherein said citrus juice is selected from the group consisting of orange juice, grapefruit juice, lemon juice, tangerine juice, and lime juice.
13. The method of claim 9, wherein said adsorbent styrene-divinyl-benzene resin comprises a non-ionic, hydrophobic cross-linked resin.
14. The method of claim 9, wherein said resin is contained within a radial flow column.
15. The method of claim 9, further comprising the step of eluting said one or more bitterness compounds from said adsorbent styrene-divinyl-benzene resin.
16. The method of claim 9, wherein said contacting citrus juice to said adsorbent styrene-divinyl-benzene resin is conducted at a flow rate of greater than or equal to 0.15 bed volumes per minute.

17. The method of claim 16, wherein said flow rate is 2 bed volumes per minute.

18. A composition, comprising an adsorbent styrene-divinyl-benzene resin having a particle size of approximately 100–200 microns.

19. The composition of claim 18 in which said adsorbent styrene-divinyl-benzene resin comprises a non-ionic, hydrophobic, cross-linked resin.

* * * * *